United States Patent [19]

Robertson

[11] 4,254,006

[45] Mar. 3, 1981

[54] ADHESION OF VINYL PLASTISOL COATINGS

[75] Inventor: Richard E. Robertson, Allen Park, Mich.

[73] Assignee: Ford Motor Company, Dearborn, Mich.

[21] Appl. No.: 824,025

[22] Filed: Aug. 12, 1977

[51] Int. Cl.$^3$ .............................................. C08K 5/12
[52] U.S. Cl. ............................................. 260/31.8 M
[58] Field of Search ............ 260/847, 31.8 R, 31.8 M, 260/30.6 R

[56] References Cited

U.S. PATENT DOCUMENTS

| | | | |
|---|---|---|---|
| 2,419,166 | 4/1947 | Rogers | 260/847 |
| 2,421,852 | 6/1947 | Rogers | 260/847 |
| 2,454,209 | 11/1948 | Rogers | 260/847 |
| 3,137,666 | 6/1964 | Lox | 260/847 |
| 3,565,836 | 2/1971 | Fuller | 260/847 |

Primary Examiner—Paul R. Michl
Attorney, Agent, or Firm—Edmund C. Ross, Jr.; Olin B. Johnson

[57] ABSTRACT

Vinyl dispersion coating compositions comprising (A) 10–40 parts by weight particulate vinyl resin; (B) 5–80 parts by weight liquid plasticizer; (C) 1–20 parts by weight adhesion promotor comprising (i) a thermoplastic phenol-formaldehyde condensate made with molar excess of the phenol and (ii) a compound that provides low molecular weight difunctional linking moieties with increase in temperature, wherein the molar ratio of the linking moieties releasable by (ii) to the total of hydrogen substituted ortho and para positions in (i) is at least about 3:4, preferably 1:1 or greater, and the weight ratio of (A) to (C) is about 40:1–1:1. Preferred plastisol sealing compositions can exhibit improvements in adhesion to hydrophilic surfaces such as glass by as much as up to five times or greater than with conventional adhesion promoters.

2 Claims, No Drawings

ADHESION OF VINYL PLASTISOL COATINGS

BACKGROUND OF THE INVENTION

Non-aqueous vinyl dispersion coating compositions have particular advantage as protective coatings in that they offer formability, weatherability, and chemical and mechanical wear resistance. They generally comprise high molecular weight particulate polymers of vinyl chloride and are often referred to as organosols and plastisols.

Some have characterized such coating compositions as "plastisols" if they are free of volatile solvent and diluent, and "organosols" if they contain volatile solvent and diluent. As used herein and when used in the appended claims the terminology "plastisol" is used in the more practical sense, namely any vinyl dispersion composition containing up to about 10% by weight volatiles. "Organosol" as that term is used herein, refers to compositions having greater than 10% by weight volatiles, e.g. low molecular weight ketones, esters and aliphatic and aromatic hydrocarbons, and can be considered volatile thinned plastisols. Vinyl dispersion coating compositions include, likewise, both organosols and plastisols.

Vinyl dispersion coating compositions basically comprise a particulate vinyl resin (normally polyvinylchloride homopolymer and often vinyl chloride-vinyl acetate copolymer) dispersed in a liquid phase comprising plasticizer therefor, and optionally solvent and diluent as well as other ingredients including pigment, filler, solution resin, surfactant and other adjuvants. If hydrophilic surfaces are to be coated, it is known that phenolic adhesion promotors may be advantageously employed.

These phenolic adhesion promotors, comprising a phenol-formaldehyde condensate made with molar excess phenol and a formaldehyde producing compound, have not been altogether satisfactory, particularly when thin film, e.g. up to 2 mm., coatings are made. According to an important aspect of this invention, thin film adhesion of vinyl coatings is dramatically improved, up to five times or more as compared to vinyl dispersion coatings which include conventional adhesion promotors. Such increased thin film adhesion can become also important when considering failures of even thick films at its thin film edges.

BRIEF DESCRIPTION OF THE INVENTION

This invention relates to vinyl dispersion coating compositions and methods of coating therewith wherein the coating composition comprises (A) about 10–40 parts by weight particulate vinyl resin having a majority of particles with diameters between about 0.05-10 microns (preferably between about 0.1-4 microns); (B) about 5-80 parts by weight liquid non-volatile plasticizer; and (C) from about 1-20 parts by weight of adhesion promotor which consists essentially of (i) a thermoplastic phenol-formaldehyde condensate with a molar excess of phenol for each mole of formaldehyde and having a number average molecular weight of between about 500-5000; and (ii) a compound that produces difunctional linking moieties for (i) at temperatures between about 80°-200° C., wherein the molar ratio of the linking moieties releasable by (ii) to the total of hydrogen substituted ortho and para sites to hydroxy of (i) is at least about 3:4, more preferably at least about 1:1 up to 10:1 or more and the weight ratio of (A) to (C) is between about 40:1–1:1. The vinyl resin coating composition is heated to fuse the particulate vinyl resin to form a continuous adhering coating at elevated temperatures (e.g., beginning about 100° C. up about to 200° C.).

DETAILED DESCRIPTION OF THE INVENTION

The vinyl dispersion coating compositions of this invention are applied to surfaces as liquids that fuse into vinyl coatings upon application of heat. The coatings desirably exhibit adhering but resilient layer after fusing.

In the liquid phase of the coating composition, vinyl polymer (characterized by an inherent viscosity of about 0.7-1.6, more desirably about 1.0-1.5) is dispersed by liquid plasticizer and, optionally, a balanced mixture of dispersing solvents and diluents. A mixture of vinyl resins comprising polyvinylchloride homopolymer and vinyl chloride-vinyl acetate copolymer (having normally up to about 15% by weight vinyl acetate) is desired although either homopolymer or copolymer may be used alone. Mixed homopolymer and copolymer resins are desirably at 1:5-5:1 weight ratios.

Advantageously, dispersion grade vinyl resins are employed in the vinyl dispersion coating compositions, such dispersion resins preferably having a majority of particles with diameters within a range of about 0.05-4 microns, and more desirably about 0.1-2 microns. Generally, dispersion resins are available in three types (1) those with high molecular weight and low emulsifier content, designed primarily for organosols, (2) resins with higher soap content for faster gelling in plastisols and (3) special resins for adjusting rheological properties of the coating composition.

Blending resins may also be incorporated into the vinyl dispersion coating compositions, such blending resins having particles with diameters of up to about 150 microns, e.g., about 10-75 microns. These blending resins advantageously lower cost of the coating compositions and may replace up to about 60% by weight or more of the dispersion resins. Further, solution vinyl resins may be employed to aid in film forming and viscosity modification, especially in organosols. Likewise, suspension resins can be used desirably to reduce viscosity of plastisols and such suspension resins are usually characterized by (1) particles with diameters being about 40-60 microns, (2) inherent viscosity being about 0.8-1.1 and (3) their particle being relatively non-absorbing and smooth.

The liquid plasticizer in the vinyl dispersion coating compositions herein serve to improve processability of the compositions as well as to impart desired flexibility to the final coating. A variety of plasticizers are readily available including aliphatic phthalates, such as dialkyl phthalates (e.g., di-$C_8$ alkyl phthalates), dialkyl adipates (e.g., diisodecyl adipates), and dialkyl sebacates (e.g., di-2-ethylhexyl sebacate). The plasticizer should exhibit (1) good compatability with the vinyl resin, (2) good solvating ability for the vinyl resin but not gel the resin at low temperature, (3) resistance to volatilization, and (4) heat and oxidative stability. Alkyl phthalates are generally preferred herein, particularly those wherein each alkyl chain is about 6-10 carbons. Supplemental plasticizers may be employed advantageously at about 1-20% by weight of the primary plasticizer, such supplemental including hydrocarbon and chlorinated hydrocarbons as well as phosphate plasticizers which also act as fire retardants.

Solvents and diluents may be optionally part of the liquid phase and modify the vinyl coating compositions. For example, ketone and ester dispersants may be included as well as glycol ethers to assist in arriving at appropriate viscosity for the coating composition and improve storage stability. These solvents which also aid in dispersing resin particles, along with volatile aromatic and aliphatic hydrocarbons, may be included at up to 60% by weight of the coating compositions herein, especially to achieve optimum balance point.

The adhesion promotor (c) in the vinyl dispersion coating compositions herein is employed at about 1-20 parts by weight, preferably in a weight ratio of vinyl resin (A) to promotor (C) of about 5:1-3:2. The adhesion promotor comprises (i) phenol-formaldehyde condensate made with more than one mole of the phenol for each mole of formaldehyde and (ii) a compound, preferably hexamethylenetetramine, that produces low molecular weight difunctional linking moieties such as methylene groups.

The phenol-formaldehyde condensates (i) are commercially available and include those designated as "novalacs". The starting phenol normally is unsubstituted by other than hydrogen in positions ortho and para to hydroxy groups but may have substitution in the meta positions. Phenols which comprise mixtures of hydroxy aromatic compounds some of which have aliphatic (e.g. 1-18 alkyl) or aromatic (e.g. phenyl) substitution in ortho or para positions to hydroxy may be used. An example of this latter phenol-formaldehyde condensate would be a condensate formed with ortho-cresol, phenol (monohydroxybenzene) and formaldehyde in the presence of acid as hydrochloric acid.

The phenol-formaldehyde condensates (i) are desirably thermoplastic due to lack of substantial crosslinking and are preferably crosslinkable. Those with number average molecular weights of from about 500-5000 (more preferably 800-2000) are preferred, particularly those with average chain lengths that are about 6-15 hydroxy benzene nuclei bridged with about 4-13 methylene groups.

In any of these given phenol formaldehyde condensates there are normally and desirably a total of at least two ortho and para positions to hydroxy groups which are substituted with hydrogen atoms per chain, and more often and more desirably many more, e.g., 8-16 or more. Thus, a linear chain condensate comprising 10 hydroxy benzene nuclei bridged with 8 methylene groups would have 12 ortho and para positions substituted with hydrogen atoms when the phenol is monohydroxybenzene.

The compound (ii) that produces low molecular weight difunctional linking moieties preferably comprises hexamethylenetetramine. Hexamethyltetramine is well known and is considered to produce six moles of linking moieties per mole. Other compounds suitable include adducts of hexamethylenetetramine and alkyl halides as well as 1, 3, 5-trioxane, paraformaldehyde, paraldehyde as well as bisulfite adducts of formaldehyde.

Essential to this invention is the use of a ratio of moles of low molecular weight linking moieties releasable from (ii) to total moles of ortho and para positions to hydroxy groups that are substituted with hydrogen in (i) of at least about 3:4, more preferably at least about 1:1 or greater up to 5:1 or greater.

Commercially materials as novalacs often are blended with formaldehyde producing compounds such as hexamethylenetetramine in particulate form and in quantities such that there are two moles of ortho and para positions to hydroxy groups substituted with hydrogen for each mole of formaldehyde releasable from the hexamethylenetetramine. In such cases, extra hexamethylenetetramine or difunctional linking moiety-producing compound may be blended into such a mixture to form the adhesion promotor of this invention.

In preparation of the vinyl dispersion coating compositions herein, the particulate vinyl resin is desirably first admixed with the liquid plasticizer. The admixing desirably is by adding smaller portions of resin to a large amount of plasticizer. Upon reaching a level of two parts by weight resin for each part by weight plasticizer, the composition becomes paste-like and the resin swollen with plasticizer. Further plasticizer may be added, or alternatively solvent and diluent added to thin the mixture. Less plasticizer, e.g., 10-25 parts by weight plasticizer per hundred parts resin may be used if desired to make organosols, but preferred plastisols herein have a weight ratio of plasticizer to resin of about 2:3-4:1.

In the preparation of organosols, conventional grinding to provide particles with a value of 6-7 on the Hegman scale is preferred. Further, in preparation of such organosols, it is desirable to first mix all liquid ingredients and thereafter mix all particulate ingredients into the mixture of dispersing solvent and diluent, the particulate ingredients being added in an order based on increasing particle size. Alternatively, a plastisol may be prepared first with later addition of dispersing solvent (e.g. ketone) or diluent (e.g. volatile aliphatic and aromatic hydrocarbons) or both to provide a desired balanced organosol.

The adhesion promotor of this invention is preferably in particulate form, ground if necessary, to particles suitable for blending with the plastisol prepared. Advantageously, difunctional linking moiety-producing compounds (ii) blended with the phenol-formaldehyde condensate (i) serve to reduce caking and maintain the adhesion promotor as a free flowing powder. Indications are that (i) and (ii) are combined in a complex in the plastisols.

Other ingredients, conventionally employed in vinyl coating compositions, may be included in the compositions herein. Thus, flame retardants, heat and light stabilizers, surfactants, fillers, pigments and the like may be included in conventional amounts.

The vinyl coating compositions of this invention can have a variety of uses including sealers for hydrophilic surfaces, primers, topcoats applied as spray coatings as well as coatings that are applied by knife and like application procedures.

Fusing of the vinyl resin coating compositions applied to substrates provides the desired continuous vinyl coatings. Fusing is normally conducted at temperatures in a range above about 80° C., preferably between about 100°-200° C. Coatings ranging in thickness up to 50 mils or higher may be obtained with coatings comprising portions up to 20 mils thick (e.g. coating overspray and edges of thicker coatings) realizing particular benefits in accordance with this invention.

The following examples are intended to illustrate this invention but the invention should not be limited thereto as those in the art will appreciate that a variety of compositions can be made according to the hereinbefore and hereinafter disclosure. All parts are parts by weight.

EXAMPLE 1

In this example, a plastisol is made by admixing in small aliquots fifty parts by weight of Geon 135 (vinyl resin marketed by BF Goodrich) with fifty parts by weight of a $C_6$–$C_{10}$ dialkyl phthalate plasticizer. Thereafter, this dispersion is divided into two equal portions (A and B) and five parts by weight of BKPA-5864 novolac (a phenol-formaldehyde condensate having 15% by weight hexamethylenetetramine and marketed by Union Carbide) is admixed into portion A and five parts by weight of the same novolac admixed with an additional 1.8 parts by weight hexamethylenetetramine into portion B.

The compositions so made are coated onto glass substrates at varying thickness, baked for eight minutes at 140° C. and the 90 degree Peel strength to glass is measured at a peel rate of 5 inches per minute.

| Coating Thickness | Coating Composition A | Coating Composition B |
|---|---|---|
| 0.1 mm | 7 N/m | 50 N/m |
| 0.2 mm | 30 N/m | 120 N/m |
| 0.3 mm | 60 N/m | 180 N/m |
| 0.4 mm | 85 N/m | 220 N/m |
| 0.5 mm | 110 N/m | 250 N/m |

As can be seen, increased amount of hexamethyleneamine results in considerably increased adhesion.

EXAMPLE 2

The procedures of Example 1 are followed except that the novolac is Durez 12686 (a cashew nutshell novolac having aliphatic substitution in the meta position of the phenol and marketed by Durez Division of Hooker Chemical). The amount of hexamethylenetetramine in each formulation C and D is such that C has 0.95 parts per 10 parts of the novolac and D has 1.84 parts per 10 parts of the novolac. The results using the same test procedure of Example 1 are as follows:

| Coating Thickness | Coating Composition C | Coating Composition D |
|---|---|---|
| 0.1 mm | 25 N/m | — |
| 0.2 mm | 45 N/m | 75 N/m |
| 0.3 mm | 80 N/m | 180 N/m |
| 0.4 mm | 120 N/m | 230 N/m |

EXAMPLE 3

A spray applied and weld through automotive body sealer composition is prepared from the following plastisol formulation:

| | |
|---|---|
| Vinyl Resin[1] | 100 parts |
| $C_6$—$C_{10}$ Dialkyl Phthalate Plasticizer | 200 parts |
| Adhesion Promotor[2] | 30 parts |
| Antimony Trioxide | 3 parts |
| White Lead | 20 parts |
| Aerosil | 3 parts |
| Calcium Carbonate | 175 parts |

[1]Vinyl Resin marketed as Geon 121 by BF Goodrich
[2]Novolac resin marketed by Union Carbide as BKPA-5864 with 4 additional parts by weight hexamethylenetetramine.

The sealer is sprayed onto a metal surface and desirable adhesion is obtained particularly in the thin film areas caused by overspray.

EXAMPLE 4

The sealer composition of Example 3 is modified by the addition of 25 parts by weight of a thinning aid comprising VM & P Naptha.

EXAMPLE 5

The procedure of Example 1 is carried out except the plasticizer is diisodecyl phthalate. Improvement on thin film adhesion is seen in the formulation of this invention.

EXAMPLE 6

The procedure of Example 2 is carried out except the plasticizer is dioctyl phthalate. Improvement in thin film adhesion is seen in the formulation made in accordance with this invention.

EXAMPLE 7

The procedure of Example 2 is carried out except the fusing is at a temperature of 160° C. for 5 minutes. Thin film adhesion improvement is seen for the compositions made in accordance with this invention.

What is claimed is:

1. A method for adhering a vinyl dispersion coating to a hydrophilic substrate wherein at least a portion of the coating comprises a layer up to 20 mils in thickness, comprising applying to the substrate a composition comprising:
   (A) about 10–40 parts by weight particulate vinyl chloride homopolymer, copolymer or mixture thereof dispersion resin having a majority of particles with diameters below about 10 microns;
   (B) about 5–80 parts by weight liquid plasticizer;
   (C) about 1–20 parts by weight of adhesion promotor consisting essentially of:
      (i) thermoplastic phenol-formaldehyde condensate made having an excess number of moles of the phenol per mole of formaldehyde and having a number average molecular weight between about 500–5000;
      (ii) a compound that produces low molecular weight difunctional linking moieties with heat selected from the group consisting of hexamethylenetetramine, adducts of hexamethylenetetramine, paraformaldehyde, paraaldehyde and adducts of formaldehyde, wherein the ratio of moles of the linking moieties produced by (ii) to the moles of ortho and para positions to hydroxy in (i) is in a range of about 3:4–10:1 and the weight ratio of (A) to (C) is in a range between about 40:1–1:1.

2. The method in accordance with claim 1, wherein (i) comprises a crosslinkable thermoplastic having a number average molecular weight in a range between about 600–1500 and (ii) comprises hexamethylenetetramine.

* * * * *